(12) United States Patent
Stoll et al.

(10) Patent No.: US 12,494,667 B2
(45) Date of Patent: Dec. 9, 2025

(54) STEP-DOWN VOLTAGE MODULE FOR EMERGENCY POWER SYSTEMS

(71) Applicant: SIGNIFY HOLDING B.V., Eindhoven (NL)

(72) Inventors: Thomas G Stoll, Collierville, TN (US); Michael Shawn Croley, Collierville, TN (US)

(73) Assignee: SIGNIFY HOLDING B.V., Eindhoven (NL)

( * ) Notice: Subject to any disclaimer, the term of this patent is extended or adjusted under 35 U.S.C. 154(b) by 91 days.

(21) Appl. No.: 18/571,929

(22) PCT Filed: Jun. 13, 2022

(86) PCT No.: PCT/EP2022/065962
§ 371 (c)(1),
(2) Date: Dec. 19, 2023

(87) PCT Pub. No.: WO2023/274696
PCT Pub. Date: Jan. 5, 2023

(65) Prior Publication Data
US 2024/0291315 A1    Aug. 29, 2024

Related U.S. Application Data

(60) Provisional application No. 63/216,024, filed on Jun. 29, 2021.

(30) Foreign Application Priority Data

Jul. 13, 2021 (EP) .................................... 21185191

(51) Int. Cl.
*H02J 9/06* (2006.01)
(52) U.S. Cl.
CPC .................................. *H02J 9/065* (2013.01)

(58) Field of Classification Search
CPC .................................. H02J 9/065; H02J 9/062
See application file for complete search history.

(56) References Cited

U.S. PATENT DOCUMENTS 8,686,662 B1    4/2014 Bragg et al.
2012/0104858 A1    5/2012 Noe

FOREIGN PATENT DOCUMENTS

DE    112019003891 T5 *    4/2021  .............. B60L 50/50

OTHER PUBLICATIONS

Contractor Lighting & Supply(CLS), "Ktat Step Down Transformer", www.contractorlighting.com; viewed on Dec. 19, 2023.

* cited by examiner

*Primary Examiner* — Henry Luong

(57) ABSTRACT

A step-down module (10) for an emergency power system (100) is disclosed. The step-down module (10) includes a step-down circuit (11) to which an AC power source (40) having an input voltage higher than 277 VAC can be connected, the step-down circuit arranged to convert the input voltage to an output voltage in the range of 120 to 277 VAC. A sensing module 14 is arranged to detect a state of an emergency driver relay (21) from an emergency lighting fixture (20). When the emergency driver relay (21) is closed, a normal operation mode is active and when the emergency driver relay (21) is open, an emergency operation mode is active. The normal operation mode is when the AC power source (40) is suppling AC power to the step-down circuit (11) and the emergency operation mode is when the AC power source (40) is not suppling AC power. A control relay (13) arranged to connect or disconnect the AC power source (40) from the emergency lighting fixture (20. A controller (12) is arranged to control the control relay depending on the state of emergency driver relay detected by the sensing module. In the normal operation mode, the control relay (Continued)

connects the AC power source (40) to the emergency lighting fixture (20) and in the emergency operation mode, the control relay disconnects the AC power source (40) from the emergency lighting fixture (20). The emergency lighting fixture (20) may be an LED-based lighting device.

8 Claims, 1 Drawing Sheet

A: LINE 480V
B: LINE 347V
C: LINE 240V
D: Neutral/Common
E: Switched AC LINE
F: 4/2.9/2 : 1
G: <10VA
H: 120V
I: LINE
J: Neutral
K: 120 Power for Emergency LED Driver
L: Normal LED Driver LINE

STEP-DOWN VOLTAGE MODULE FOR EMERGENCY POWER SYSTEMS

CROSS-REFERENCE TO PRIOR APPLICATIONS

This application is the U.S. National Phase application under 35 U.S.C. § 371 of International Application No. PCT/EP2022/065962, filed on Jun. 13, 2022, which claims the benefit of European Patent application Ser. No. 21/185, 191.0, filed on Jul. 13, 2021, and U.S. Provisional Application No. 63/216,024, filed on Jun. 29, 2021. These applications are hereby incorporated by reference herein.

FIELD OF THE INVENTION

The invention relates to systems and devices for emergency power and lighting systems more particularly, to a step-down voltage module for emergency LED lighting devices.

BACKGROUND

When a power failure/outage occurs, there is a need for emergency backup power systems to provide temporary emergency power. Conventional backup power systems may include uninterruptible power supplies (or UPS) to provide emergency power to a load when an input power source, e.g., mains power fails.

Emergency lighting refers to lighting that is activated upon power failure. An objective of emergency lighting is to allow occupants in a building to leave the building safely upon power failure or in other emergency situations. Within a building, the emergency lighting is usually provided by an emergency lighting device (e.g., LED or fluorescent lamp) powered by the emergency backup power system or an internal battery. The emergency backup power may come from an emergency battery.

In traditional emergency-light power supplies when the commercial power supply is on (or active), the emergency-light power supply is under a standby state. When the commercial power supply is powered off (e.g., due to a failure), a relay turns on an emergency battery loop to power one or more emergency lighting devices. When the commercial power supply is active again, the relay will turn off the emergency battery power supplied to the emergency lighting devices and the emergency-light power supply returns to the standby (battery charging) state.

As noted above, the emergency lighting device may also include an internal battery. For example, a typical emergency LED driver charges the internal batteries from the AC mains power supply The AC mains generally are within the 120 to 277 VAC input voltage range. However, in some applications, the available AC voltage is higher than 277 VAC (e.g., 347 VAC in Canada and 480 VAC in certain industrial/warehouse applications). To accommodate such higher AC voltages, a relatively expensive and bulky step-down transformer is required to step down these higher AC voltages to something in the 120 to 277 VAC input voltage range to be compatible with existing emergency LED drivers or other emergency devices such as an uninterruptible power supply (UPS) that may also be used to provide emergency power.

DE 11 2019 003891 relates to a network connection system, a connection control device, and a network connection method which can prevent the supply of power from being cut off at the time of power restoration. A grid connection system for a power grid comprises: a storage battery; a power conversion device that converts power from the storage battery into AC power; and a connection control device that supplies power from a utility power supply to a load and supplies power from the power conversion device to the load when the utility power supply fails. When the utility power supply is restored, the connection control device starts supplying power from the utility power supply to the load and stops supplying power from the power conversion device to the load after starting the supply of power from the utility power supply to the load.

U.S. Pat. No. 8,686,662 B1 relates to exit and egress lighting, emergency lighting or emergency light fixture, having internal supercapacitor power sources are recharged after a power outage using a staggered power up process. For example, once an emergency light fixture detects a power-on transition from power being unavailable on a power source to power being available from the power source, the fixture waits a predetermined time to recharge a supercapacitor based on a charge time delay value. The predetermined time may be selected to be unique for one or several emergency light fixtures so as to distribute a combined peak power demand of the fixtures. After the predetermined time has expired, the supercapacitor is electrically coupled to a power source to in order to recharge the supercapacitor.

There is a need to provide cost effective and/or improved systems to allow for charging from higher input AC voltages.

This document describes systems and methods that are intended to address at least some issues discussed above and/or other issues as discussed below.

SUMMARY OF THE INVENTION

Aspects and embodiments of the present invention address the shortcomings noted above.

One aspect of the present invention is related to an improved interface to step down higher input AC voltages (e.g., above 277 VAC) to 120-277 VAC to be compatible with typical emergency lighting devices (e.g., emergency LED drivers).

In some aspects of the present invention, this is accomplished by electronically stepping down higher input AC voltages and providing controls for coordinating the proper function of the normal and emergency LED drivers in both standby and active modes of operation.

Various embodiments and aspects of the present invention may include a step-down circuit to achieve the proper voltage and current for emergency battery charging (i.e., standby mode) and control within the emergency LED driver, a control relay for switching to normal (non-emergency) or emergency LED driver mode, a sensing circuit to monitor the status of an emergency control relay, and control circuitry to coordinate switching between normal and emergency modes.

Other aspects of the present invention utilize a multi-tap low frequency transformer and an AC coil relay with high voltage contacts. This configuration allows the AC coil relay to directly control the coil of the emergency control relay. This will reduce the component count of the step-down voltage interface.

One embodiment of the present invention is directed to a step-down module for an emergency power system. The step-down module includes a step-down circuit to which an AC power source having an input voltage higher than 277 VAC can be connected. The step-down circuit is arranged to convert the input voltage to an output voltage in the range of 120 to 277 VAC. A sensing module is used to detect a state of an emergency driver relay from an emergency lighting fixture. When the emergency driver relay is closed, a normal operation mode is active and when the emergency driver relay is open, an emergency operation mode is active. The normal operation mode is when the AC power source is suppling AC power to the step-down circuit and the emergency operation mode is when the AC power source is not suppling AC power. A control relay is arranged to connect or disconnect the AC power source from the emergency lighting fixture. A control circuit switches the control relay depending on the state of emergency driver relay detected by the sensing module. In the normal operation mode, the control relay connects the AC power source to the emergency lighting fixture and in the emergency operation mode, the control relay disconnects the AC power source from the emergency lighting fixture. The emergency lighting fixture may be an LED-based lighting device.

Another embodiment of the present invention is directed to a step-down module for an emergency power system including a transformer arranged to receive an input AC voltage that is higher than a required AC voltage for proper charging of an emergency lighting device and convert the input AC voltage to the required AC voltage for the emergency lighting device. An AC coil relay is controlled by an emergency relay in the emergency lighting device. When the emergency driver relay is closed, the emergency lighting fixture receives battery charging power from the transformer and when the emergency driver relay is open, the emergency lighting fixture uses internal battery power, and the AC coil relay disconnects the input AC voltage from the emergency lighting device. The transformer may be a multi-tap low frequency transformer.

The present invention enables an emergency lighting system to be applied to any large-scale lighting application without changing the available AC power supply and can be used with existing emergency lighting devise that require commercial AC power (e.g., 120 or 277 VAC) for emergency battery charging purposes.

For example, a lighting system may include a luminaire with a high voltage AC driver operating in high voltage AC range, e.g., 277/347/480 VAC and an emergency LED driver operating in a commercial AC voltage range e.g., 120 VAC. In accordance with aspects of the present invention, a step-down module feeds the switched AC mains (277/247/480 VAC) to the high AC driver and a step-down circuit provides a charging current fed to the emergency LED driver for charging an internal battery. The step-down module then monitors the switched AC mains to determine whether the luminaire is switched on or off and is able to determine a power loss based on monitoring the unswitched AC mains. The step-down module further monitors the state of the emergency LED driver to determine which mode the emergency LED driver is in, as it may switch from a normal operation mode to an emergency operation mode when there is a loss of the AC mains or a user pushes a test mode button. In case of a loss of power from the AC mains or activation of the test mode, the step-down module would disconnect the high voltage AC driver from the AC mains and use the battery to feed from the emergency luminaire driver directly. In normal operations mode, the switched AC mains power the high voltage AC LED driver and commercial AC voltage from the step-down circuit charges the battery.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

Further details, aspects, and embodiments of the invention will be described, by way of example only, with reference to the drawings. Elements in the figures are illustrated for simplicity and clarity and have not necessarily been drawn to scale. In the Figures, elements which correspond to elements already described may have the same reference numerals. In the drawings, FIG. 1 schematically shows elements of an emergency lighting system according to one embodiment of the present invention, and FIG. 2 schematically shows elements of an emergency lighting system according to another embodiment of the present invention.

DETAILED DESCRIPTION OF PREFERRED EMBODIMENTS

Figure 1:
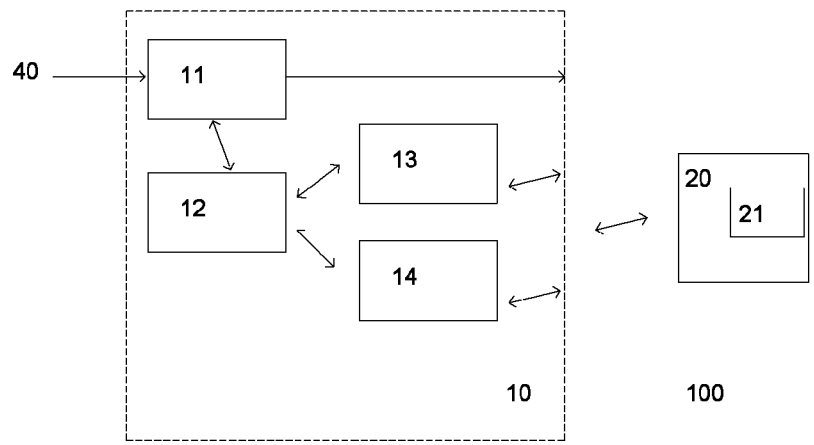

While this invention is susceptible of embodiment in many different forms, there are shown in the drawings and will herein be described in detail one or more specific embodiments, with the understanding that the present disclosure is to be considered as exemplary of the principles of the invention and not intended to limit the invention to the specific embodiments shown and described.

In the following, for the sake of understanding, elements of embodiments are described in operation. However, it will be apparent that the respective elements are arranged to perform the functions being described as performed by them.

The term "LED" should be understood to include any electroluminescent diode or other type of carrier injection/junction-based system that is capable of generating radiation in response to an electric signal. Thus, the term LED includes, but is not limited to, various semiconductor-based structures that emit light in response to current, light emitting polymers, organic light emitting diodes (OLEDs), electroluminescent strips, and the like. In particular, the term LED refers to light emitting diodes of all types (including semi-conductor and organic light emitting diodes) that may be configured to generate radiation in one or more of the infrared spectrum, ultraviolet spectrum, and various portions of the visible spectrum (generally including radiation wavelengths from approximately 400 nanometers to approximately 700 nanometers). Some examples of LEDs include, but are not limited to, various types of infrared LEDs, ultraviolet LEDs, red LEDs, blue LEDs, green LEDs, yellow LEDs, amber LEDs, orange LEDs, and white LEDs (discussed further below). It also should be appreciated that LEDs may be configured and/or controlled to generate radiation having various bandwidths (e.g., full widths at half maximum, or FWHM) for a given spectrum (e.g., narrow bandwidth, broad bandwidth), and a variety of dominant wavelengths within a given general color categorization.

It should also be understood that the term LED does not limit the physical and/or electrical package type of an LED.

For example, as discussed above, an LED may refer to a single light emitting device having multiple dies that are configured to respectively emit different spectra of radiation (e.g., that may or may not be individually controllable). Also, an LED may be associated with a phosphor that is considered as an integral part of the LED (e.g., some types of white LEDs). In general, the term LED may refer to packaged LEDs, non-packaged LEDs, surface mount LEDs, chip-on-board LEDs, T-package mount LEDs, radial package LEDs, power package LEDs, LEDs including some type of encasement and/or optical element (e.g., a diffusing lens), etc.

The term "light source" should be understood to refer to any one or more of a variety of radiation sources, including, but not limited to, LED-based sources (including one or more LEDs as defined above), incandescent sources (e.g., filament lamps, halogen lamps), fluorescent sources, phosphorescent sources, high-intensity discharge sources (e.g., sodium vapor, mercury vapor, and metal halide lamps), lasers, other types of electroluminescent sources, pyro-luminescent sources (e.g., flames), candle-luminescent sources (e.g., gas mantles, carbon arc radiation sources), photo-luminescent sources (e.g., gaseous discharge sources), cathode luminescent sources using electronic satiation, galvano-luminescent sources, crystallo-luminescent sources, kine-luminescent sources, thermo-luminescent sources, triboluminescent sources, sonoluminescent sources, radioluminescent sources, and luminescent polymers.

The term "lighting fixture or device" is used herein to refer to an implementation or arrangement of one or more lighting units in a particular form factor, assembly, or package. The term "lighting unit" is used herein to refer to an apparatus including one or more light sources of same or different types. A given lighting unit may have any one of a variety of mounting arrangements for the light source(s), enclosure/housing arrangements and shapes, and/or electrical and mechanical connection configurations. Additionally, a given lighting unit optionally may be associated with (e.g., include, be coupled to and/or packaged together with) various other components (e.g., control circuitry) relating to the operation of the light source(s). An "LED-based lighting unit" refers to a lighting unit that includes one or more LED-based light sources as discussed above, alone or in combination with other non LED-based light sources.

As used herein for purposes of the present disclosure, the term "load" refers to an electronic device drawing current from a power source. Examples of a load may include an internal battery of an emergency lighting device, a UPS, a lighting device, such as resistive incandescent, halogen, compact fluorescent lights light-emitting diodes (LEDs), and lamp drivers or other device that requires AC power as an input.

Further, the invention is not limited to the embodiments, and the invention lies in each and every novel feature or combination of features described herein or recited in mutually different dependent claims.

FIG. 1 shows an example of emergency lighting system (ELS) 100 according to one embodiment. The ELS 100 includes a step-down module 10, one or more emergency lighting fixtures 20 including an emergency driver relay 21. In this configuration, the emergency lighting devices 20 is the load. The one or more emergency lighting fixtures 20, for example, may be LED-based lighting units. Typical LED-based lighting units used for emergency lighting applications include an emergency LED driver that require an input (via an emergency LED driver charger input (typically via the black and white contact connections)) AC voltage in the range of 120 to 277 VAC. The step-down module 10 is connected to an input AC power source 40 (not shown). In this configuration, the AC power source is an unswitched AC main input to the step-down module 10. The input AC power source 40 may supply AC voltages higher than 120 VAC and, in particular, in the range of 277 to 480 VAC.

The step-down module 10 includes a step-down circuit 11, a controller 12, a control relay 13 and a sensing module 14. The terms "controller", "circuit" or "module" are used herein generally to describe a structure or circuitry that can be implemented in numerous ways (e.g., such as with dedicated hardware and/or software) to perform various functions discussed herein. The structure or circuitry may include, for example, transistors, diodes, resistors, capacitors, Integrated Circuits (ICs) and processors. A "processor" is one example of a controller (or a central component of a controller) which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

The step-down circuit 11 is configured to achieve a proper voltage and current for supplying electrical power to the emergency lighting fixtures 20. The electrical power may be used to charge an internal battery (not shown) that forms part of the emergency lighting fixture 20. The emergency lighting fixture 20 may be powered from AC mains system (normal operating mode) or from an integrated battery (emergency operating mode). The step-down module converts the AC voltage (i.e., higher than 277 VAC) input from the AC power source 40 to a useable voltage (e.g., in the range of 120 to 277 VAC) for the charging the internal battery of the emergency lighting fixtures 20.

In this regard, the step-down circuit 11 is an AC to AC converter. The step-down circuit 11 converts the input AC waveform of specific magnitude and specific frequency into AC waveforms with different magnitude. Various types of AC to AC converters may be used to implement the step-down circuit 11 such as step down cycloconverters, single phase to single phase cycloconverters, three phase to single phase cycloconverters, three phase to three phase cycloconverters, envelope cycloconverters, phase controlled cycloconverters, CSI converters, transformers, VSI converters, sparse matrix converters, very sparse matrix converters, ultra sparse matrix converters, and hybrid matrix converters. The step-down circuit 11 may also be implemented using Switched Mode Power Supply (SMPS). SMPS circuits offer an efficient way to reduce AC from a mains source to a desired AC voltage level. The SMIPS circuits use conventional components such as control ICs, switching transistors, capacitors, and inductors. The SMPS circuits do not require the use of transformers.

The controller 12 is used to control and coordinate switching between normal and emergency operation modes. The normal operation mode is when the AC power source 40 is suppling AC power (i.e., AC mains active). The emergency operation mode is when the AC power source 40 is not suppling AC power (i.e., failure of AC mains). The controller 12 may include an algorithm/firmware that determines and switches between the normal and the emergency operation modes based on the state (e.g., active or failure) of the AC power source 40 and information from the sensing module 14 related to the state (e.g., open or closed) of the emergency driver relay 21.

For example, in one embodiment, the sensing module 14 monitors and detects the state of the emergency driver relay 21 (e.g., typically via the white/red and white/black contact connections) that is used to control, via the control relay 13, a 120-277 VAC normal LED driver (part of the emergency lighting fixtures 20). Whenever the emergency driver relay 21 is closed, the normal operation mode is active. This also means that the emergency lighting fixture 20 is in charging mode (using power supplied by the step-down circuit 11). Whenever the emergency driver relay 21 is open, the emergency operation mode is active. This also means that the emergency lighting fixture 20 is in discharging mode (i.e., power to the light source of the emergency lighting fixtures 20 is being supplied from the internal batteries). In this regard, the control relay 13 disconnects the AC power source 40 (i.e., AC mains) from the normal LED driver (typically via the black contact connection) whenever there is a loss of power on the AC power source 40.

Figure 2:
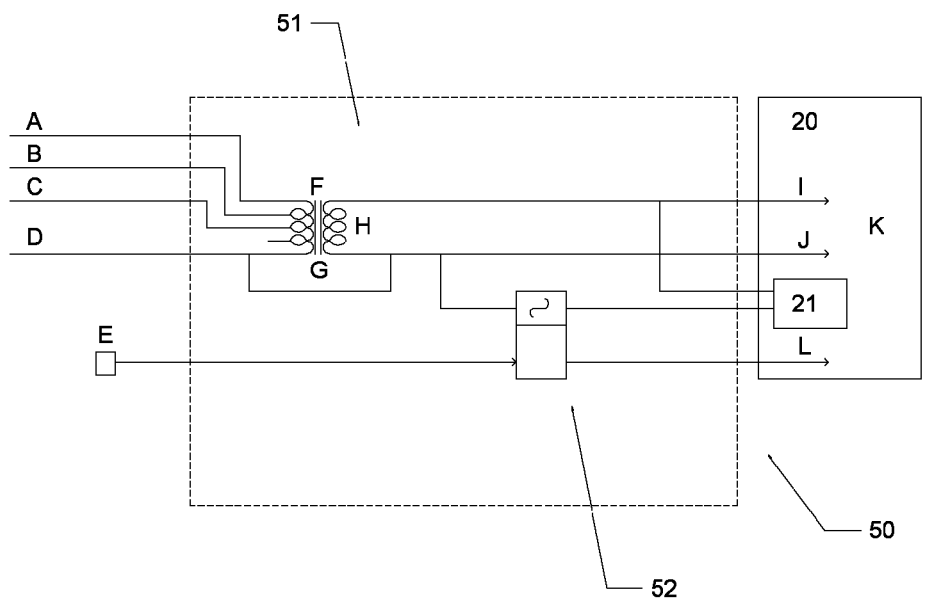

FIG. 2 show another embodiment of the present invention. In this embodiment, a step-down module 50 includes transformer 51 and an AC coil relay 52 with high voltage contacts. The transformer 51 may be, for example, a multi-tap low frequency transformer or a single-tap low frequency transformer. As shown in FIG. 2, as an input, the transformer 51 can have one or more AC power inputs ("AC mains"). As shown in FIG. 2, these AC power inputs may be 240 VAC, 347 VAC and/or 480 VAC. The step-down module 50 is connected to the emergency lighting fixture 20. The output AC voltage level of the transformer 51 and is configured for the required AC voltage level (e.g., 120 VAC) for proper charging of the emergency lighting fixture 20. In this arrangement, the emergency relay 21 directly controls the AC coil relay 52. This embodiment reduces the component count and elements the need for the controller 12 and the sensing module 14 of the embodiment of FIG. 1.

Similar to the embodiment of FIG. 1, whenever the emergency driver relay 21 is closed, the normal operation mode is active. This also means that the emergency lighting fixture 20 is in charging mode (using power supplied by the multi-tap low frequency transformer 51). Whenever the emergency driver relay 21 is open, the emergency operation mode is active. This also means that the emergency lighting fixture 20 is in discharging mode (i.e., power to the light source of the emergency lighting fixture 20 is being supplied from the internal batteries). The AC coil relay 52 disconnects the AC mains from the normal LED driver when there is a loss of power from the AC mains.

It should be understood that the various elements/blocks shown in FIGS. 1 and 2 may be combined or modified to provide the functionality and structures described above. In addition, a combination of hardware and software may be used for implementation.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

In the claims references in parentheses refer to reference signs in drawings of exemplifying embodiments or to formulas of embodiments, thus increasing the intelligibility of the claim. These references shall not be construed as limiting the claim.

The invention claimed is:

1. A step-down module for an emergency power system, comprising:
    a step-down circuit to which an AC power source having an input voltage higher than 277 VAC is connected, the step-down circuit configured to convert the input voltage to an output voltage in the range of 120 to 277 VAC;
    a sensing module arranged to detect a state of an emergency driver relay from an emergency lighting fixture, wherein when the emergency driver relay is closed, a normal operation mode is active and when the emergency driver relay is open, an emergency operation mode is active, and wherein the normal operation mode is when the AC power source is suppling AC power to the step-down circuit and the emergency operation mode is when the AC power source is not suppling AC power;
    a control relay configured to connect or disconnect the AC power source from the emergency lighting fixture; and
    a controller configured to control the control relay depending on the state of emergency driver relay detected by the sensing module, wherein in the normal operation mode, the control relay connects the AC power source to the emergency lighting fixture and in the emergency operation mode, the control relay disconnects the AC power source from the emergency lighting fixture.

2. The step-down module of claim 1, wherein the emergency lighting fixture is configured to be an LED-based lighting device.

3. The step-down module of claim 1, wherein the AC power source is configured to have an input voltage of about 347 VAC.

4. The step-down module of claim 1, wherein the AC power source is configured to have an input voltage of about 480 VAC.

5. The step-down module of claim 1, wherein the step-down circuit is a cycloconverter.

6. The step-down module of claim 1, wherein the step-down circuit is a SMPS circuit.

7. The step-down module of claim 1, wherein the emergency lighting fixture includes a battery and the output voltage from the step-down circuit is used to charge the battery in the normal operation mode.

8. The step-down module of claim 7, wherein the battery is configured to power the emergency lighting fixture in the emergency operation mode.

\* \* \* \* \*